Figure 1:
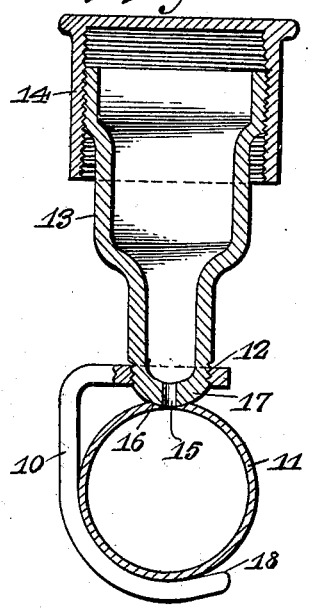

S. E. NORMAN.
GREASE CUP SUPPORT.
APPLICATION FILED DEC. 17, 1918.

1,317,938.

Patented Oct. 7, 1919.

Inventor
S. E. Norman,
By
Lacey & Lacey, Attorneys

UNITED STATES PATENT OFFICE.

STERLING E. NORMAN, OF FRANKLIN, MASSACHUSETTS.

GREASE-CUP SUPPORT.

1,317,938.   Specification of Letters Patent.   Patented Oct. 7, 1919.

Application filed December 17, 1918. Serial No. 267,194.

*To all whom it may concern:*

Be it known that I, STERLING E. NORMAN, a citizen of the United States, residing at Franklin, in the county of Norfolk and State of Massachusetts, have invented certain new and useful Improvements in Grease-Cup Supports, of which the following is a specification.

This invention relates to improvements in devices for holding a lubricant and commonly known as grease cups, upon the body to receive the lubricant, and has for one of its objects to simplify and improve the construction of devices of this character.

The improved device is designed more particularly for holding a grease cup upon a movable body such as a flexible driving shaft, and enables the grease cup to be quickly applied and firmly held in position, and which will not be displaced by the movements of the shaft. The improved device is designed more particularly for application to the flexible shafting of speedometers employed in connection with automobiles, but may be readily applied to any form of shaft or other body into which a lubricant is to be periodically or continuously injected.

For the purpose of illustration the improved device is shown applied to a section of a tubular shaft, and in the drawings—

Figure 2:
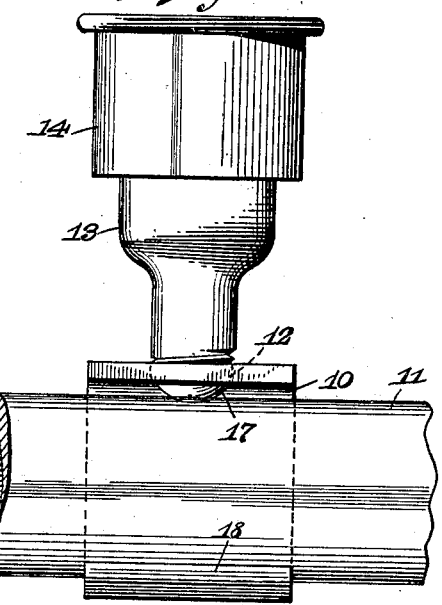
Figure 3:
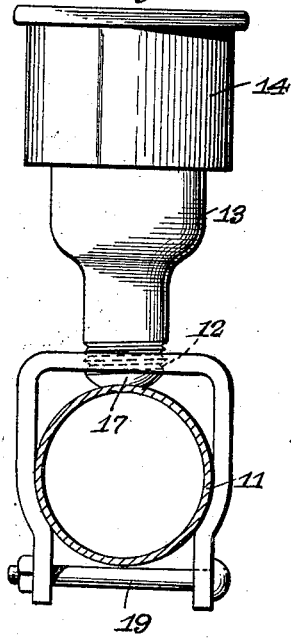

Figure 1 is a sectional elevation of a grease cup with the coupling means partly in section, Fig. 2 is a side elevation of the parts shown in Fig. 1, Figs. 3, 4 and 5 are views similar to Fig. 1 illustrating modifications in the construction of the coupling mechanism, The improved device includes a clip member 10 adapted to bear partly around a hollow shaft 11 into which the lubricant is to be injected. The member 10 is provided with a threaded aperture 12 in one arm to receive the threaded terminal of a receptacle for a lubricant, such for instance as the base portion of a grease cup 13, the latter having a screw cap 14 by which the lubricating material may be forced through the discharge orifice 15. The shaft 11 is provided with a concaved socket 16 having a central opening registering with the orifice 15, and the terminal of the member 13 is rounded as shown at 17 to engage oil tight in the socket 16, and firmly coupled thereto by rotating the member 13 to cause the coacting threads to produce the requisite pressure. By this means a simple coupling device is provided whereby the grease cup may be attached firmly in place relatively to the shaft 11, and which will not be displaced by the movement of the shaft. In Figs. 1 and 2 a portion of the member 10 is formed to embrace a corresponding portion of the shaft as shown at 18, to prevent the displacement of the holding device when strain is applied by rotating the member 13. In Fig. 3 the member 10 is shown formed with spaced arms or side portions connected by a tie bolt 19 at the side opposite to the threaded aperture 12.

Figure 4:
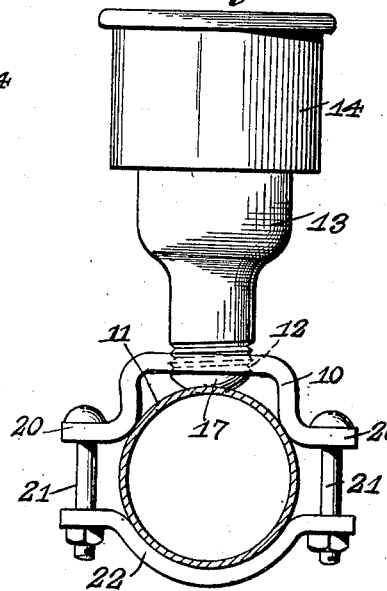

In Fig. 4 the member 10 is formed with laterally directed portions 20 apertured to receive clamp bolts 21, the latter engaging a clip device 22 bearing against the side of the member 11 opposite to the threaded aperture 12.

Figure 5:
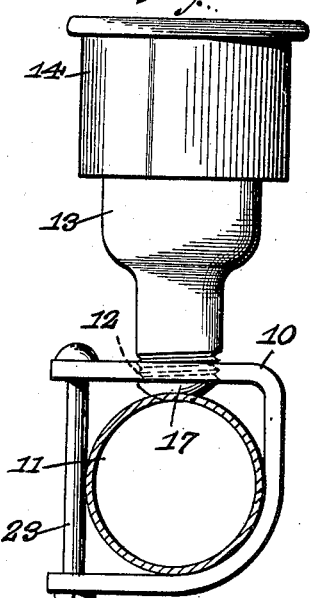

In Fig. 5 the member 10 is similar to the structure shown in Fig. 1 except that its terminals are coupled by a tie bolt 23.

If desired the member 13 shown in Figs. 3 to 5 inclusive instead of being threaded in the clip 10 may be welded or otherwise rigidly secured thereto without departing from the spirit of the invention.

Having thus described the invention, what is claimed as new is:

1. The combination with a tubular body having an inlet aperture surrounded by an exterior seat, of a supporting clip embracing the tubular body, a lubricant holder carried by the clip and having a terminal fitting the seat of the tubular body and provided with a discharge orifice registering with the inlet aperture in said tubular body, and means for positively clamping the clip in position on the tubular body.

2. The combination with a tubular body having an inlet aperture surrounded by an exterior depressed seat, of a supporting clip embracing the tubular body and bearing thereagainst at one point only, a lubricant body carried by the clip and having its lower end reduced and extended through the clip and provided with a curved terminal conforming to and adapted to fit the seat in the tubular body, said curved terminal being provided with a discharge orifice registering with the inlet aperture, and means for positively clamping the clip in position on the tubular body.

3. The combination with a tubular body having an inlet aperture surounded by an exterior depressed seat, of a supporting clip including portions at opposite sides of the tubular body, one of said clip portions being spaced from the tubular body and having a threaded aperture, and a lubricant holder including a threaded base engaging the threaded aperture in the supporting clip and having a discharge orifice surrounded by a seat conforming to and fitting within the seat in the tubular body.

4. The combination with a tubular body having an inlet aperture, of a supporting clip embracing the tubular body and having one end thereof bearing against said tubular body and its other end spaced therefrom and provided with a threaded aperture, and a lubricant holder having a threaded portion engaging the threaded aperture in the clip and provided with a discharge orifice registering with the inlet aperture in the tubular member, said lubricant holder being adjustable with respect to the clip whereby to lock the parts against accidental displacement on the tubular body.

5. The combination with a tubular body having an inlet aperture surrounded by an exterior depressed seat, a supporting clip embracing the major portion of the tubular body and having one end thereof spaced from said body and formed with a threaded opening, a lubricant holder having a reduced portion exteriorly threaded and engaging the threaded walls of the opening in the clip, the lower end of the reduced portion of the lubricant holder being provided with a curved terminal adapted to fit the seat in the tubular member and having a discharge orifice formed therein and registering with the inlet aperture in said tubular member.

In testimony whereof I affix my signature.

STERLING E. NORMAN. [L. S.]

Copies of this patent may be obtained for five cents each, by addressing the "Commissioner of Patents, Washington, D. C."